(12) United States Patent
Kathmann et al.

(10) Patent No.: US 9,588,924 B2
(45) Date of Patent: Mar. 7, 2017

(54) HYBRID REQUEST/RESPONSE AND POLLING MESSAGING MODEL

(75) Inventors: Kevin J. Kathmann, Rochester, MN (US); Alexei L. Pytel, Rochester, MN (US); Steven J. Simonson, Rochester, MN (US); Bruce W. Talbott, Rochester, MN (US); Thomas J. Wasik, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 383 days.

(21) Appl. No.: 13/116,865

(22) Filed: May 26, 2011

(65) Prior Publication Data
US 2012/0303721 A1    Nov. 29, 2012

(51) Int. Cl.
*G06F 13/38* (2006.01)
*G06F 13/40* (2006.01)

(52) U.S. Cl.
CPC ................... *G06F 13/387* (2013.01)

(58) Field of Classification Search
CPC ............. G06F 11/3006; G06F 11/3055; G06F 13/387; H01R 13/436; H01R 13/506; H01R 13/516
USPC .......................................................... 709/206
See application file for complete search history.

(56) References Cited

U.S. PATENT DOCUMENTS

| | | | |
|---|---|---|---|
| 6,243,762 B1 | 6/2001 | Greene et al. | |
| 7,539,995 B2 | 5/2009 | Supalova | |
| 7,921,423 B2 | 4/2011 | Gupta et al. | |
| 8,090,914 B2* | 1/2012 | Tierney et al. | 711/145 |
| 2005/0267897 A1* | 12/2005 | D'Costa | G06Q 10/20 709/204 |
| 2008/0102861 A1* | 5/2008 | Linsky | H04W 76/021 455/458 |
| 2008/0154954 A1* | 6/2008 | Ho et al. | 707/104.1 |
| 2009/0094366 A1* | 4/2009 | D'Costa et al. | 709/226 |
| 2010/0174941 A1* | 7/2010 | Rajadeva et al. | 714/15 |
| 2010/0251244 A1* | 9/2010 | Fukui | 718/100 |

(Continued)

FOREIGN PATENT DOCUMENTS

| JP | 406266569 A | 9/1994 |
|---|---|---|
| JP | 02000267866 A | 9/2000 |

*Primary Examiner* — Andrew Lai
*Assistant Examiner* — M Mostazir Rahman
(74) *Attorney, Agent, or Firm* — Cantor Colburn LLP; William A. Kinnaman, Jr.

(57) ABSTRACT

A hybrid messaging model including a method that sends a first request message from a control process executing on a computer to a plurality of subordinate processes. The first request message directs the subordinate processes to enter a first state. An expected state is set equal to the first state in response to sending the first request message. A status message, including the expected state, is periodically broadcast from the control process to the plurality of subordinate processes. At least one confirmation message is received from each of the subordinate processes confirming that the subordinate process is in the expected state. Each of the confirmation messages is responsive to either the first request message or to the status message. A second request message is sent from the control process to the plurality of subordinate processes in response to receiving at least one confirmation message from each of the subordinate processes.

20 Claims, 4 Drawing Sheets

(56) References Cited

U.S. PATENT DOCUMENTS

2011/0271126 A1* 11/2011 Hill .............................. 713/320

* cited by examiner

HYBRID REQUEST/RESPONSE AND POLLING MESSAGING MODEL

BACKGROUND

The present invention relates to data processing, and more specifically to a messaging model for providing communication between two or more computer processes.

Multiprocessor computer systems increase processing bandwidth and generally improve throughput, reliability, and serviceability when compared to single processor computing systems. Multiprocessing computing systems perform individual tasks using a plurality of processing elements, which may include multiple individual processors linked in a network, or a plurality of software processes or threads operating concurrently in a coordinated environment.

Multiprocessor computer systems may include multiple, individual computer systems, referred to as partitioned systems. Other multiprocessor systems include one or more computer systems that are logically partitioned to behave as multiple independent computer systems. For example, a single system having eight processors might be configured to treat each of the eight processors (or multiple groups of one or more processors) as a separate system for processing purposes. Each of these "virtual" systems (or images) has its own copy of an operating system, and may then be independently assigned tasks; or multiple virtual systems may operate together as a processing cluster, which provides for both high speed processing and improved reliability.

Individual systems in a multiprocessor system typically share resources and a messaging model (or protocol) may be used to coordinate accesses between the processors and shared resources. Examples of resources that may be shared include, but are not limited to: a single simultaneous peripheral operations on-line (SPOOL) file, a cache, and a database.

SUMMARY

An embodiment is a method that includes sending a first request message from a control process executing on a computer to a plurality of subordinate processes. The first request message directs the subordinate processes to enter a first state. An expected state is set equal to the first state in response to sending the first request message. A status message, including the expected state, is periodically broadcast from the control process to the plurality of subordinate processes. At least one confirmation message is received from each of the subordinate processes confirming that the subordinate process is in the expected state. Each of the confirmation messages is responsive to either the first request message or to the status message. A second request message is sent from the control process to the plurality of subordinate processes in response to receiving at least one confirmation message from each of the subordinate processes.

Another embodiment is a system that includes a processor configured to perform a method. The method includes sending a first request message from a control process executing on a computer to a plurality of subordinate processes. The first request message directs the subordinate processes to enter a first state. An expected state is set equal to the first state in response to sending the first request message. A status message, including the expected state, is periodically broadcast from the control process to the plurality of subordinate processes. At least one confirmation message is received from each of the subordinate processes confirming that the subordinate process is in the expected state. Each of the confirmation messages is responsive to either the first request message or to the status message. A second request message is sent from the control process to the plurality of subordinate processes in response to receiving at least one confirmation message from each of the subordinate processes.

A further embodiment is a computer program product that includes a tangible storage medium readable by a processing circuit and storing instructions for execution by the processing circuit for performing a method. The method includes sending a first request message from a control process executing on a computer to a plurality of subordinate processes. The first request message directs the subordinate processes to enter a first state. An expected state is set equal to the first state in response to sending the first request message. A status message, including the expected state, is periodically broadcast from the control process to the plurality of subordinate processes. At least one confirmation message is received from each of the subordinate processes confirming that the subordinate process is in the expected state. Each of the confirmation messages is responsive to either the first request message or to the status message. A second request message is sent from the control process to the plurality of subordinate processes in response to receiving at least one confirmation message from each of the subordinate processes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is a unique messaging model for use when a control process directs the execution of multiple subordinate processes via request messages. In an embodiment, the control process requires a response (or confirmation) from the subordinate processes confirming that the desired states specified in the request messages have been reached. Instead of tracking the state of a request message and responses to the request, an embodiment of the control process tracks only the desired states of the subordinate processes. A polling process makes these expected states known to the subordinate processes, and if a subordinate process is not currently in the expected state, the subordinate process take appropriate action to reach the expected state.

As used herein, the term "request/response messaging model" refers to a messaging model where a control process sends a request to a subordinate process and waits for a response from the subordinate process. Benefits to using a request/messaging model include quick response times and the transmission of a relatively small number of messages. Examples of request/response messaging models include, but are not limited to: cross-system coupling facility (XCF), and transmission control protocol/Internet protocol (TCP/IP), as well as protocols such as hyper-text transfer protocol (HTTP). Given XCF within a single operating system, request/response messages are transported using a cross-memory service.

As used herein, the term "polling messaging model" refers to a messaging model where periodic messages are sent from the control process to subordinate processes to check the state of the subordinate processes. Benefits to using a polling messaging model include the ability to check the state of subordinate processes on a periodic basis. Examples of polling messaging models include, but are not limited to: socket applications which use the poll( ) socket application programming interface (API). For example, the poll( ) API can be used to determine if a file descriptor is readable. A poll( ) invocation only determines readability at that instant of time and does not block like a select( ) API. Many applications built upon sockets use a polling mechanism.

Figure 1:
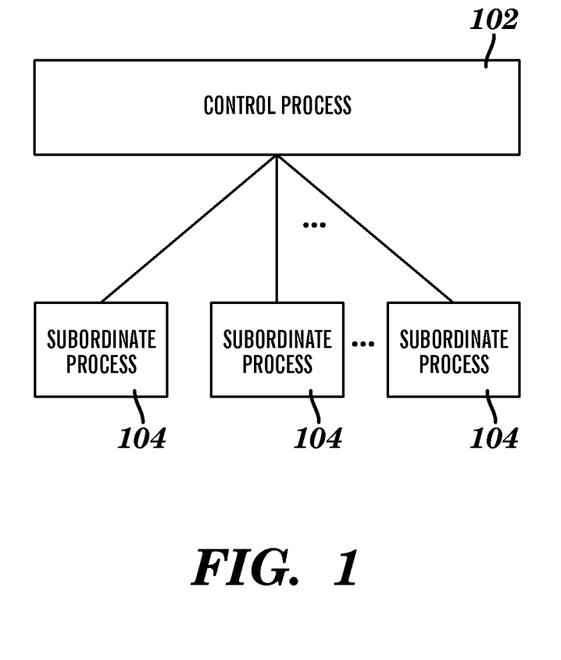
FIG. 1 depicts a block diagram of a control process and several subordinate processes in accordance with an embodiment.

FIG. 1 depicts a block diagram of a control process 102 and several subordinate processes 104 in accordance with an embodiment. As described herein, a request/response message exchange between the control process 102 and the subordinate processes 104 is augmented with a periodic broadcast of status messages by the control process 102. In an embodiment, the status message has enough information in it so that each subordinate process 104 can determine the state that the control process 102 expects from this subordinate process 104. If the subordinate process 104 detects that the desired state was achieved but the control process 102 has no awareness of that, then a confirmation message is sent to the control process 102. If the subordinate process 104 detects that desired state was not yet achieved, then appropriate action is taken and a confirmation message is sent to the control process 102. This method provides automatic recovery of lost request and response messages and prevents hangs and delays caused by the lost messages.

In an embodiment, the control process 102 directs all of the subordinate processes 104 to take on the same state. In another embodiment, the control process 102 directs different subordinate processes 104 to take on different states depending on factors such as physical location, current state, etc.

In an embodiment, a messaging model involves one control system and multiple subordinate systems. The control system broadcasts a request to all subordinate systems informing each to take certain actions and to send response back. In this example, the subordinate system goes down before the request message is received and the subordinate system comes back up at a later time. In the meantime, the control system is waiting for a response from the subordinate system. The control system broadcasts a status message, which contains required actions and a bitmap representing which subordinate systems have responded. The subordinate system notices at some point (via the status message) that the control system is waiting for a response and proceeds to take the required action and sends a response. This provides additional backup in messaging models where a message delivery is not guaranteed (e.g., TCP/IP, user datagram protocol or "UDP) or when a message is lost due, for example to a software failure.

Figure 2:
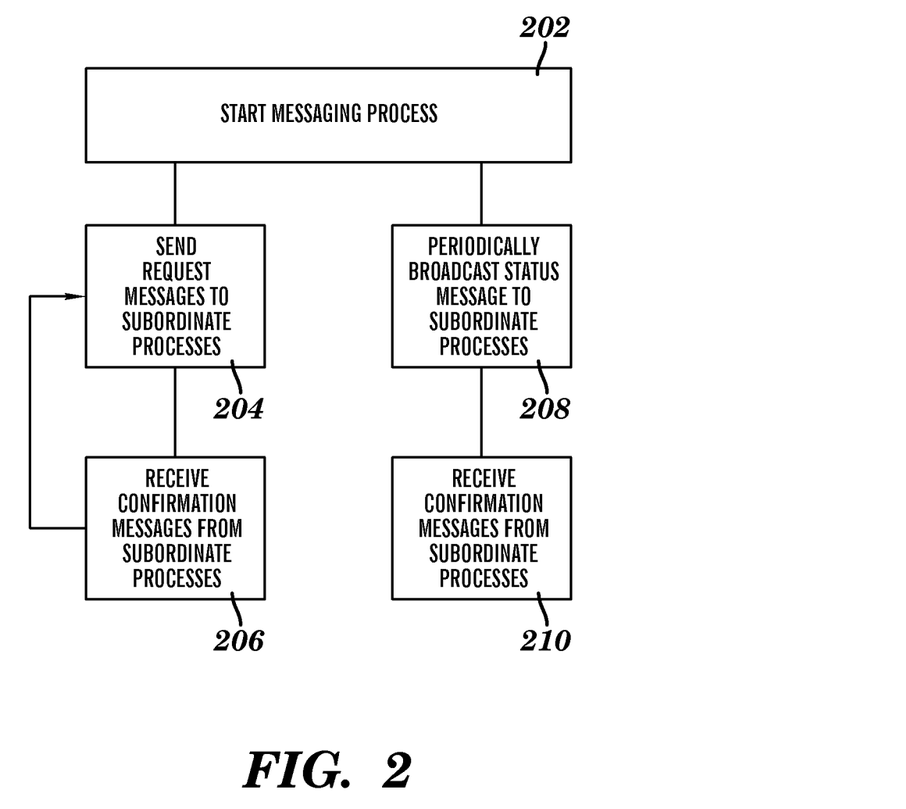
FIG. 2 depicts a process flow at a control process in accordance with an embodiment.

FIG. 2 depicts a process flow of a control process, such as control process 102, in accordance with an embodiment. In an embodiment, the process flow depicted in FIG. 2 executes on a processor in a multiprocessor computer system. At block 202, the messaging process is initiated. Processing then continues in parallel at blocks 204 and 208. At block 204, the control process sends a request message to one or more subordinate processes, such as subordinate process 104. In an embodiment, the request message directs the subordinate process to enter a specified state by performing a function or by taking some other action. At block 206, the control process receives a response message(s) corresponding to the request message from the one or more subordinate processes. In an embodiment, the response message is a confirmation message confirming that the specified function was performed, and thus that the subordinate process has entered the specified state. In another embodiment, the response message returns a status relative to the request. In the process shown in FIG. 2, processing continues to loop through blocks 204 and 206 for each request message that the control process sends to the subordinate processes.

At block 208, the control process periodically broadcasts status messages to the subordinate processes. In an embodiment, a status message includes an expected state of the subordinate processes. At block 210, the control process receives a confirmation message from each subordinate process that received the status message. The confirmation message includes a confirmation that the subordinate process has reached the expected state. In another embodiment, the control process only receives a confirmation message at block 210 from subordinate processes where action was taken to move the subordinate process from its current state into the expected state; i.e., those processes where upon receipt of the broadcast status message the expected state was not equal to the current state.

In embodiments described herein there is a chance that the control process will receive more than one confirmation message from a subordinate process for each request message sent to the subordinate process and thus, embodiments of the control process must be able to handle multiple responses from the subordinate process per request message.

In an embodiment, the status messages are broadcast every specified number of clock cycles while the messaging process is active. In another embodiment, the status messages are broadcast in response in to detecting specified system events (e.g., control process is waiting for a response or otherwise stalled). In a further embodiment, these two previous manners of broadcasting periodically are combined.

In an embodiment, the processing of blocks 204-206 is performed in parallel and independently of the processing performed by blocks 208-210. In addition, there is no need for the control process to maintain a copy of the request message until all responses are received. This is because, instead of tracking the state of a request message and responses to the request message, the central process tracks only the desired state (expected state) of the subordinate processes. The polling process described herein in blocks 208-210 of FIG. 2 makes this desired state known to the subordinate processes, which can then take appropriate action.

Figure 3:
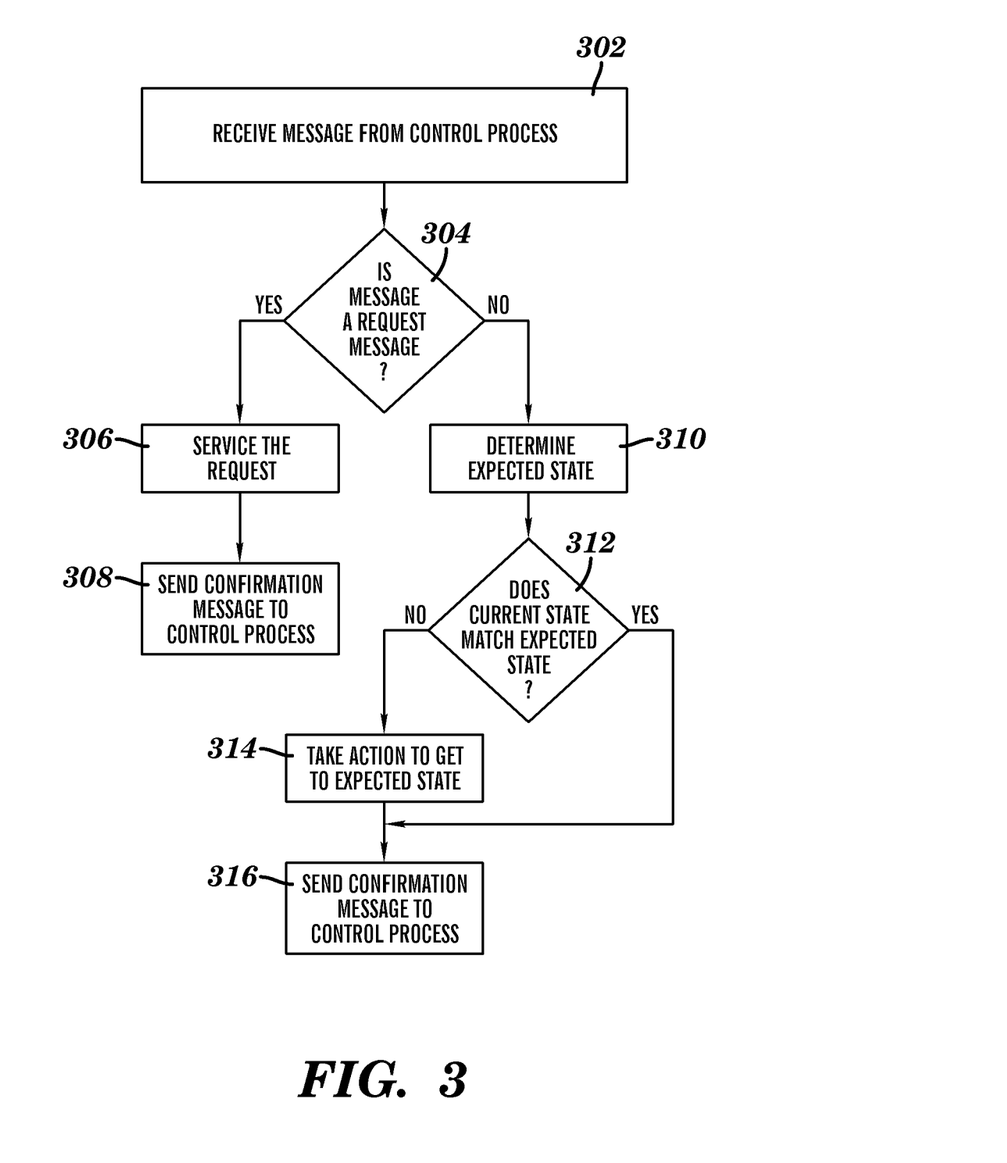
FIG. 3 depicts a process flow at a subordinate process in accordance with an embodiment.

FIG. 3 depicts a process flow at a subordinate process in accordance with an embodiment. In an embodiment, the process flow depicted in FIG. 3 executes on a processor in a multiprocessor computer system. At block 302, a subordinate process, such as subordinate process 104, receives a message from a control process, such as control process 102. At block 304, it is determined if the message is a request message. If the message is a request message, then block 306 is performed and the request is serviced. In an embodiment, servicing request includes performing a function or taking some action based on contents of the request message to move the subordinate process into a target (or expected) state. At block 308, the subordinate process sends a response message to the control process. In an embodiment, the response message confirms that the requested action was taken and that the subordinate process has moved into the target state. In another embodiment, the response message contains information pertaining to the status of the subordinate process relative to the requested action.

If, as determined at block 304, the message is not a request message but instead is a broadcast message, then block 310 is performed. At block 310, the subordinate process reads the broadcast message to determine the state that the control process expects the subordinate process to have. This information may be determined by the subordinate process based on the broadcast message including a current state of the control process and any response that the control process is waiting for from the subordinate processes. Alternatively, the status message may contain the expected state of the subordinate processes. At block 312, it is determined if the current state of the subordinate process matches the expected state of the subordinate process. In an embodiment, block 312 is performed by code on the subordinate process that detects whether the desired state as specified by the control process has been satisfied.

If it is determined that the current state of the subordinate process matches the expected state of the subordinate process, then processing continues at block 316 and a confirmation message is sent to the control process. If it is determined that the current state of the subordinate process does not match the expected state of the subordinate process, then block 314 is performed to take an action to get the subordinate process into the expected state. In embodiment, the subordinate process waits a configurable of amount of time and reconfirms that the states do not match before performing block 314. If after the configurable amount of time the states do match, then processing continues at block 316. After block 314 is performed, the subordinate process sends a confirmation message to the control process at block 316.

In an embodiment, along with broadcasting information about the desired state of the subordinate processes, the status message also includes information specific to each subordinate process about what state the control process thinks the subordinate process is currently in. In this embodiment, each subordinate process includes code to decipher which portion of the status message applies to the subordinate process in order to determine what the control process has recorded as the state of the subordinate process. In this embodiment, the subordinate process does not send back a confirmation message to the control process if the current state matches the expected state (as determined at block 312) and the current state matches the state that the control process has recorded for the subordinate process. This embodiment results in fewer confirmation messages being sent between the control and subordinate processes at a cost of an increase in the size of the broadcast message and some additional code.

Figure 4:
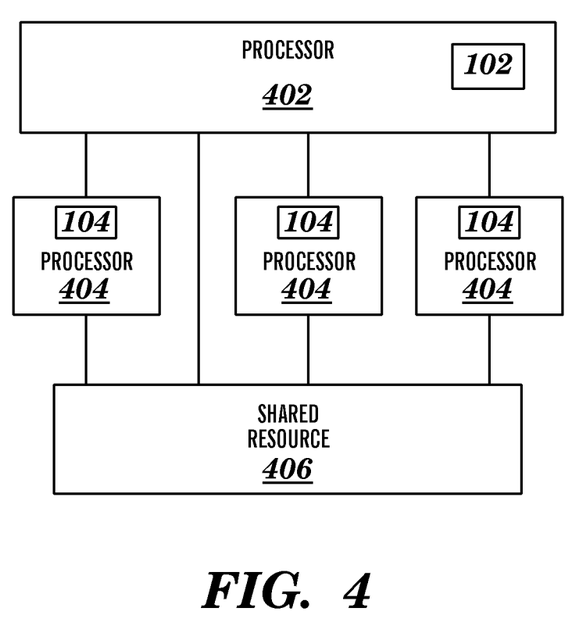
FIG. 4 depicts a block diagram of a system in accordance with an embodiment.

FIG. 4 depicts a block diagram of a multiprocessor computer system in accordance with an embodiment. The system includes three processors 404 (three are shown but any number may be implemented) executing the subordinate processes 104 and one processor 402 executing the control process 102. Processor 402, which is executing the control process 102, is in communication with the three processors 404 that are executing the subordinate processes 104. In addition, all of the processors 402 404 are in communication with the shared resource 406. Shared resources may include, but are not limited to a cache, a SPOOL file, a memory. In an embodiment, the processors 402 404 are located on the same physical computer. In another embodiment, the processors 402 404 are located on different physical computers and are in communication via a direct connection and/or via a network. The configuration shown in FIG. 4 is intended to be non-limiting and exemplary in nature as any other configurations that support messaging between multiple processes may be implemented by embodiments described herein.

Technical effects and benefits include providing a request/response messaging model that includes enhanced redundancy, which may lead to higher system availability. Embodiments of the messaging model described herein provide an additional level of redundancy is configurations where there is one control process directing execution of one or more subordinate processes via request message and the subordinate takes some action and send confirmation to the control process.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
sending a first request message from a control process executing on a computer to a plurality of subordinate processes, the first request message directing the subordinate processes to enter a first state;
setting an expected state equal to the first state in response to sending the first request message;
periodically broadcasting a status message from the control process to the plurality of subordinate processes until at least one confirmation message is received from each of the subordinate processes, the status message comprising the expected state, wherein in response to one of the subordinate process not being in the expected state, the subordinate process takes an action to get the subordinate process into the expected state after waiting a configurable amount of time and sends the at least one confirmation message to the control process; and
based on receiving from each of the subordinate processes the at least one confirmation message confirming that the subordinate process is in the expected state, the at least one confirmation message responsive to either the first request message or to the status message:

sending a second request message from the control process to the plurality of subordinate processes
wherein the second request message directs the subordinate processes to enter a second state, the second state different than the first state, and
wherein the control process directs execution of the subordinate processes via the first and second request messages.

2. The method of claim 1, further comprising setting the expected state equal to the second state in response to sending the second request message.

3. The method of claim 1, wherein the sending a first request message is via a cross-system coupling facility (XCF).

4. The method of claim 1, wherein the sending a first request message is via a request/response messaging model.

5. The method of claim 1, wherein the periodically broadcasting is via a polling messaging model.

6. The method of claim 1, further comprising:
receiving the status message at a subordinate process, the subordinate process having a current state;
determining whether the current state matches the expected state;
entering the expected state at the subordinate process in response to determining that the current state does not match the expected state; and
sending the at least one confirmation message responsive to entering the expected state.

7. The method of claim 1, wherein at least one of the subordinate processes is executing on the computer.

8. The method of claim 1, wherein at least one of the subordinate processes is executing on another computer.

9. A system comprising a processor configured to perform a method, the method comprising:
sending a first request message from a control process to a plurality of subordinate processes, the first request message directing the subordinate processes to enter a first state;
setting an expected state equal to the first state in response to sending the first request message;
periodically broadcasting a status message from the control process to the plurality of subordinate processes until at least one confirmation message is received from each of the subordinate processes, the status message comprising the expected state, wherein in response to one of the subordinate process not being in the expected state, the subordinate process takes an action to get the subordinate process into the expected state after waiting a configurable amount of time and sends the at least one confirmation message to the control process;
based on receiving from each of the subordinate processes the at least one confirmation message confirming that the subordinate process is in the expected state, each of the confirmation messages responsive to either the first request message or to the status message:
sending a second request message from the control process to the plurality of subordinate processes,
wherein the second request message directs the subordinate processes to enter a second state, the second state different than the first state, and
wherein the control process directs execution of the subordinate processes via the first and second request messages.

10. The system of claim 9, wherein the method further comprises setting the expected state equal to the second state in response to sending the second request message.

11. The system of claim 9, wherein the sending a first request message is via a cross-system coupling facility (XCF).

12. The system of claim 9, wherein the sending a first request message is via a request/response messaging model and the periodically broadcasting is via a polling messaging model.

13. The system of claim 9, wherein the method further comprises:
receiving the broadcast status message at a subordinate process, the subordinate process having a current state;
determining whether the current state matches the expected state;
entering the expected state at the subordinate process in response to determining that the current state does not match the expected state; and
sending the at least one confirmation message responsive to entering the expected state.

14. The system of claim 9 further comprising a second processor configured to perform a method comprising:
receiving the broadcast status message at a subordinate process, the subordinate process having a current state;
determining whether the current state matches the expected state;
entering the expected state at the subordinate process in response to determining that the current state does not match the expected state; and
sending the at least one confirmation message responsive to entering the expected state.

15. A non-transitory computer program product comprising:
a tangible storage medium readable by a processing circuit and storing instructions for execution by the processing circuit for performing a method comprising:
sending a first request message from a control process to a plurality of subordinate processes, the first request message directing the subordinate processes to enter a first state;
setting an expected state equal to the first state in response to sending the first request message;
periodically broadcasting a status message from the control process to the plurality of subordinate processes until at least one confirmation message is received from each of the subordinate processes, the status message comprising the expected state, wherein in response to one of the subordinate process not being in the expected state, the subordinate process takes an action to get the subordinate process into the expected state after waiting a configurable amount of time and sends the at least one confirmation message to the control process; and
based on receiving from each of the subordinate processes the at least one confirmation message confirming that the subordinate process is in the expected state, each of the confirmation messages responsive to either the first request message or to the status message:
sending a second request message from the control process to the plurality of subordinate processes,
wherein the second request message directs the subordinate processes to enter a second state, the second state different than the first state, and
wherein the control process directs execution of the subordinate processes via the first and second request messages.

16. The non-transitory computer program product of claim 15, wherein the method further comprises setting the expected state equal to the second state in response to sending the second request message.

17. The non-transitory computer program product of claim 15, wherein the sending a first request message is via a cross-system coupling facility (XCF).

18. The non-transitory computer program product of claim 15, wherein the sending a first request message is via a request/response messaging model and the periodically broadcasting is via a polling messaging model.

19. The non-transitory computer program product of claim 15, wherein the method further comprises:
  receiving the broadcast status message at a subordinate process, the subordinate process having a current state;
  determining whether the current state matches the expected state;
  entering the expected state at the subordinate process in response to determining that the current state does not match the expected state; and
  sending the at least one confirmation message responsive to entering the expected state.

20. The non-transitory computer program product of claim 15 further comprising a second processor configured to perform a method comprising:
  receiving the broadcast status message at a subordinate process, the subordinate process having a current state;
  determining whether the current state matches the expected state;
  entering the expected state at the subordinate process in response to determining that the current state does not match the expected state; and
  sending the at least one confirmation message responsive to entering the expected state.

* * * * *